United States Patent
Duelli

(10) Patent No.: US 6,485,007 B1
(45) Date of Patent: Nov. 26, 2002

(54) DIAPHRAGM BELLOWS DEVICE

(75) Inventor: Bernhard Duelli, Uebersaxen (AT)

(73) Assignee: VAT Holding AG, Haag (CH)

( * ) Notice: Subject to any disclaimer, the term of this patent is extended or adjusted under 35 U.S.C. 154(b) by 0 days.

(21) Appl. No.: 10/141,167

(22) Filed: May 7, 2002

(51) Int. Cl.[7] ................................ F16F 1/20; F16F 1/34
(52) U.S. Cl. ........................................ 267/164; 267/162
(58) Field of Search .......................... 267/70, 160, 162, 267/164, 118, 121, 122, 151, 259

(56) References Cited

U.S. PATENT DOCUMENTS 3,665,832 A * 5/1972 Harvey ........................... 95/39
4,674,911 A * 6/1987 Gertz ........................... 267/116
5,529,293 A * 6/1996 Haugs ........................... 267/118

* cited by examiner

*Primary Examiner*—Christopher P. Schwartz
(74) *Attorney, Agent, or Firm*—Reed Smith LLP

(57) ABSTRACT

A diaphragm bellows device comprises a diaphragm bellows with a plurality of successive diaphragms which are welded together alternately at the outer and inner edges, wherein the length of the diaphragm bellows can be adjusted between an expanded state and a contracted state, and a plurality of sleeve parts which surround the successive diaphragms and which, together, enclose the successive diaphragms also in the expanded state of the diaphragm bellows over its entire longitudinal extension and overlap to a greater or lesser extent in axial direction of the diaphragm bellows depending on the adjusted length of the diaphragm bellows, wherein at least one of the sleeve parts is held on the welded outer edges of two adjoining diaphragms by a snap connection.

14 Claims, 2 Drawing Sheets

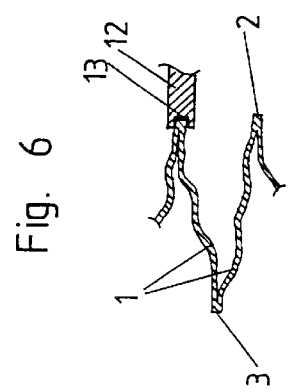
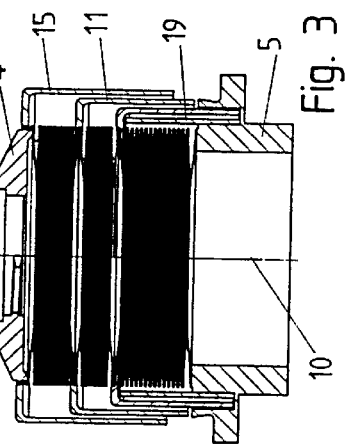
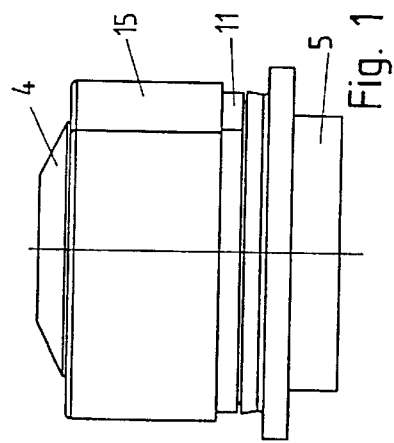
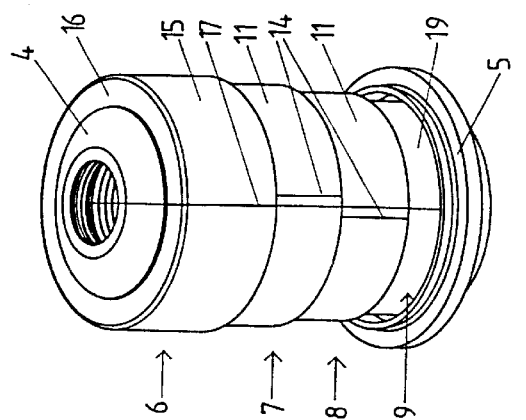
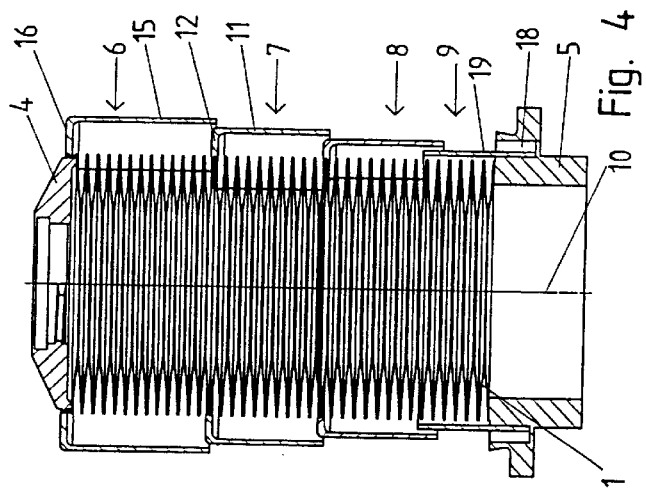
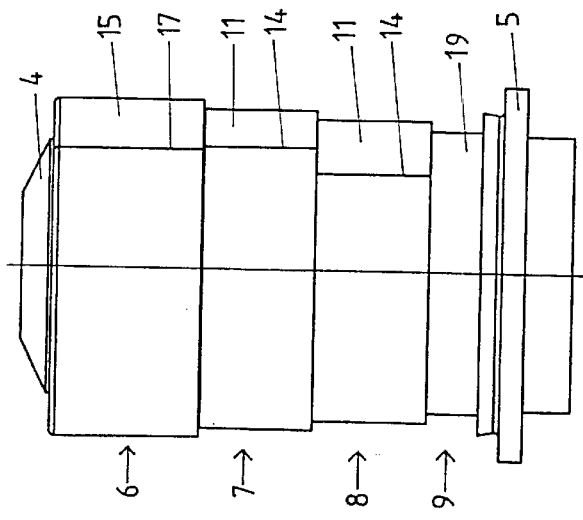

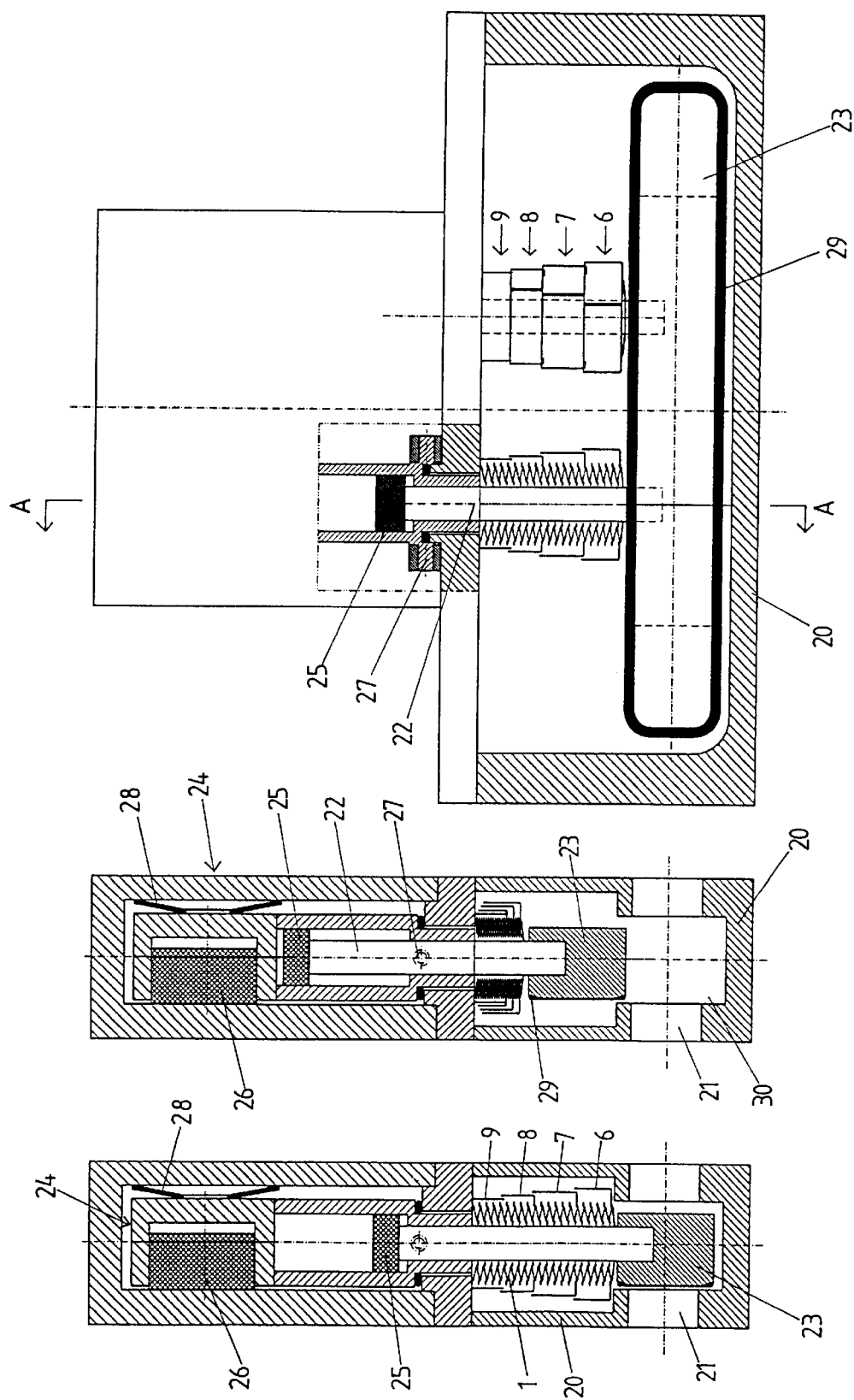

DIAPHRAGM BELLOWS DEVICE

BACKGROUND OF THE INVENTION a) Field of the invention

The invention is directed to a diaphragm bellows device comprising a diaphragm bellows with a plurality of successive diaphragms which are welded together at the outer and inner edges, wherein the diaphragm bellows can be adjusted in length between an expanded state and a contracted state, and comprising a protective device surrounding the successive diaphragms.

b) Description of the Related Art

Diaphragm bellows of the type mentioned above, which are used particularly as vacuum leadthroughs, are known in various embodiment forms. For example, these diaphragm bellows are used for sealing actuating stems or spindles inside a housing of a vacuum valve. Diaphragm bellows are adjustable in length between a contracted state and an expanded state. Normally, the device in connection with which the diaphragm bellows is used has a limit for the expansion of the diaphragm bellows which predetermines the completely expanded state of the diaphragm bellows. The maximum length of the diaphragm bellows in its fully expanded state is usually also specified by the manufacturer.

In diaphragm bellows of this kind, when foreign bodies fall into the intermediate spaces located between two adjacent diaphragms at the outer side of the diaphragm bellows and are trapped there, this could damage the diaphragm bellows when contracted, possibly after repeated expansion and contraction processes, so that the diaphragm bellows are no longer tight. Diaphragm bellows are used, for example, in transfer valves arranged between two vacuum chambers and frequently lie below the valve opening in the installed state. When a wafer breaks while moving through the valve opening, splinters or fragment s of this wafer can fall between the diaphragms and be trapped in the gaps between the diaphragms.

For this reason, it has already been suggested to protect the diaphragm bellows by surrounding it with a self-supporting, telescoping sleeve. This is disadvantageous particularly in that particles are generated and released in to the vacuum when the telescoping parts of the sleeve are displaced relative to one another. Also, these telescoping sleeves have a relatively large installed length which can increase space requirements.

OBJECT AND SUMMARY OF THE INVENTION

An important object of the invention is to provide a diaphragm bellows device in which the diaphragm bellows is protected against the penetration of parts into the gaps between two adjacent diaphragms so that additional particles are prevented as far as possible from being released into the vacuum when the diaphragm bellows are adjusted. Another object of the invention is to provide a diaphragm bellows device which is simple to produce and assemble and in which the diaphragm bellows are protected against penetration and release of foreign bodies between the adjacent diaphragms.

According to the invention, this object is met by a diaphragm bellows device which comprises:

a diaphragm bellows with a plurality of successive diaphragms which are alternately welded together at the outer and inner edges, wherein the length of the diaphragm bellows can be adjusted between an expanded state and a contracted state, and a plurality of sleeve parts which surround the successive diaphragms and which, together, enclose the successive diaphragms in the expanded state of the diaphragm bellows over its entire longitudinal extension and overlap to a greater or lesser extent in axial direction of the diaphragm bellows depending on the adjusted length of the diaphragm bellows, wherein at least one of the sleeve parts is held on the welded outer edges of two adjoining diaphragms by means of a snap connection.

No other separate guide device is required for the at least one sleeve part that is held on the outer edges of two adjacent diaphragms. During the length adjustment of the diaphragm bellows, this sleeve part is carried along by the movement of the diaphragms themselves.

In an advantageous embodiment form of the invention, the diaphragms at the ends are welded to end pieces by which the diaphragm bellows can be connected to other parts. In this way, for example, a vacuum-tight connection with a vacuum chamber or a part of a vacuum valve can be produced. Insofar as end pieces of this kind are provided, diaphragm bellows is understood in the present Application to mean the unit comprising the successive diaphragms with the end pieces welded to both ends. In principle, it would also be conceivable and possible to connect, particularly to weld, the end diaphragms on one or both sides directly to a part of the vacuum device, for example, to a part of a vacuum valve.

In a preferred embodiment form of the invention, an end piece sleeve part is fastened to the two end pieces of the diaphragm bellows and extends from this end piece in the direction of the other end piece. The end piece sleeve parts and the one or more sleeve parts fastened to the outer edges of two adjacent diaphragms also overlap somewhat in axial direction in the expanded state of the diaphragm bellows. The sleeve parts that are individually fastened to the end pieces and to the diaphragms are advantageously spaced apart somewhat in radial direction and therefore do not contact one another. Due to this fact that the individual sleeve parts are arranged without contacting and, accordingly, without friction, practically no additional particles are generated during the contraction and expansion of the diaphragm bellows.

In an advantageous embodiment form of the invention, each of the one or more sleeve parts held at the outer edges of two adjoining diaphragms has a jacket and a web which projects inward therefrom and which is provided with a groove-shaped recess at its inner end side in order to clip the sleeve part to the outer edges of the two adjoining diaphragms.

The various features and constructions according to the invention are set forth in the claims.

The invention will be described more fully in the following with reference to the accompanying drawings, from which further objects and advantages follow.

BRIEF DESCRIPTION OF THE DRAWINGS

In the drawings:

FIGS. 1 and 2 are side views of a diaphragm bellows device, according to the invention, in the contracted and expanded state;

FIGS. 3 and 4 are longitudinal central sections through the diaphragm bellows devices of FIGS. 1 and 2;

FIG. 5 is a perspective view of the diaphragm bellows device in the expanded state;

FIG. 6 is an enlarged detail of a section corresponding to FIG. 4;

FIG. 7 is a partial sectional view of a vacuum valve with a diaphragm bellows device according to the invention;

FIG. 8 shows a section along line AA in FIG. 7; and

FIG. 9 shows the fully open state of the valve in a section corresponding to FIG. 8.

For reasons of clarity, the views contained in the drawings are more or less schematic. Parts which are identical or at least similar in function are provided with identical reference numbers in the drawings.

DESCRIPTION OF THE PREFERRED EMBODIMENT EXAMPLES

The diaphragm bellows device, according to the invention, shown in FIGS. 1 to 6 has a diaphragm bellows with a plurality of successive annular diaphragms 1 having outer edges 2 and inner edges 3 defining an inner opening of the diaphragm bellows. Successive diaphragms 1 are alternately welded to one another at their outer and inner edges. The two diaphragms 1 at the ends are welded with an end piece 4, 5, respectively, by which the diaphragm bellows can be connected to other parts of a vacuum device, particularly in a vacuum-tight manner. Such diaphragm bellows are known.

A diaphragm bellows device according to the invention further has a plurality of sleeve parts 6 to 9 which enclose the successive diaphragms 1 and which, in their entirety, surround the successive diaphragms along their entire longitudinal extension also in the expanded state of the diaphragm bellows. The sleeve parts 6 to 9 overlap in direction of the longitudinal axis 10 of the diaphragm bellows to a greater or lesser extent depending on the adjusted length of the diaphragm bellows, as is shown particularly in FIGS. 3 and 4. In the present embodiment example, there is a slight overlapping in the fully expanded state corresponding to FIG. 4; however, the successive diaphragms 1 are still completely enclosed, considered in side view, by this overlap (FIG. 2). The length of the diaphragm bellows in its expanded state is normally determined by the apparatus in connection with which it is used.

In the embodiment example shown in FIGS. 1 to 6, four sleeve parts are provided, one sleeve part 6, 9 being fastened to the end pieces 4, 5, respectively, and the middle two sleeve parts 7, 8 being fastened to the diaphragms 1.

Each of the two middle sleeve parts 7, 8 fastened to the diaphragms 1 has a jacket 11 and a web 12 in the area of an axial edge of the jacket 11, this web 12 projecting inward from the jacket 11. The web 12 is provided with a groove-shaped recess 13 (FIG. 6) at its inner end side. The sleeve parts 7, 8 comprise a springing-elastic material and are constructed, for example, as plastic injection molded parts, deep-drawn sheet metal parts or from aluminum. A slit 14 which penetrates the web extends over the radial extension of the web 12 in radial direction. This slit 14 continues into the jacket 11 and extends in axial direction along its axial extension L and penetrates the jacket 11. The sleeve parts 7 and 8 are split by this slit and can expand somewhat accompanied by enlargement of the slit. In this way, the inner edge of the web 12 can be guided over the outer edges 2 of the diaphragms 1 and placed at the predetermined location with its groove-shaped recess 13 on the welded outer edges 2 of two adjacent diaphragms 1 as can be seen particularly from FIG. 6.

Other types of snp connections for the sleeve parts 7, 8 on the outer edges 2 of the diaphragms 1 are also conceivable and possible within the framework of the invention. For example, it would also be possible to clip on the sleeve parts 7, 8 without forming the slit 14 if the webs 12 which project inward were constructed so as to be correspondingly elastic. In order to increase their elasticity, the webs 12 which project inward can also have a plurality of recesses arranged at a distance from one another in circumferential direction so as to form a plurality of tongues extending inward.

In the present embodiment example, the sleeve part 6 is constructed similar to the sleeve parts 7, 8 and is clipped onto a spring-like, circumferentially extending protuberance of the end piece 4 by means of a groove-shaped recess which is arranged at the inner front edge of its web 16 projecting from the jacket 15. As in sleeve parts 7, 8, the jacket 15 and the web 16 are split by a slit 17. It is also certainly conceivable and possible to fasten the sleeve part 6 to the end piece 4 in other ways, although fastening by means of a snap connection is preferable.

The opposite end piece 5 has a recess 18 extending in axial direction and opening toward the end piece 4. The sleeve part 9 fastened to the end piece 5 projects into this recess and contacts the radial inner surface of the recess. The sleeve part 9 can be fastened in the recess 18 by frictional engagement or, for example, can also be welded to the end piece 5. In the present embodiment example, the sleeve part 9 is formed by the jacket 19 shaped like a pipe piece and extends from the sleeve part 5 in the direction of the end piece 4.

The radii of the jackets 19, 11 and 15 increase from one sleeve part to the next, proceeding from sleeve part 9, so that the jackets 19, 11 and 15 also do not contact in the overlapping area. This increase in the radii can be relatively small and, for example, can be approximately equal to the thickness of the jacket of the preceding sleeve part. In FIG. 4, the radius of the jacket 15 of the sleeve part 6 fastened to the end piece 4 is designated by R. In the contracted state, the end of the jacket 11 of the sleeve part 8 facing the end piece 5 has entered the recess 18 (see FIG. 3).

In the embodiment example shown in FIGS. 1 to 6, the jackets 19, 11 and 15 of the sleeve parts are constructed in the shape of a cylindrical jacket. The jackets 19, 11 and 15 could also be conical, particularly when the resulting openings between the sleeve parts face downward, so that there is hardly any risk that foreign bodies will enter through these openings.

In one or more sleeve parts, the web 12, 16 could also be provided in a middle area of the jacket 11, 15 rather than in the axial edge area of the jacket.

FIGS. 7 to 9 show a possible application of a diaphragm bellows device according to the invention in connection with a vacuum valve by way of example. This vacuum valve has a valve housing 20 with a valve opening 21 which can be closed by a closure part 23 fastened to valve rods 22. An actuating device 24, which in this case comprises two piston-cylinder devices, serves to open and close the valve. The closure part 23 can be moved between a position releasing the valve opening (FIG. 9) and a position opposite the valve opening (FIG. 8) by means of the piston 25. In order to close the valve completely, the valve rods 22 are swiveled about the axes 27 by means of the piston 26 against the force of a spring 28 proceeding from the position shown in FIG. 8, so that the seal 29 of the closure part 23 contacts the sealing surface 30.

The diaphragm bellows surrounding the valve rod is shown without end pieces in FIGS. 7 to 9. Although such end pieces are preferably provided in order to facilitate assembly of the valve and enable subsequent disassembly, the diaphragms 1 on the edge side could also, in theory, be welded directly to the valve housing 20 on one side and to the valve rod 22 or closure part 23 on the other side. In this case, a sleeve part 19 shaped like a pipe piece could be fastened directly to the valve housing and enclose the diaphragms 1 adjacent to the valve housing 20. The other sleeve parts 6 to 8 are clipped to the diaphragm edges and the sleeve part 6 adjacent to the closure part 23 is clipped to the outer edges of the diaphragm pair at the edge side which are welded together.

While the foregoing description and drawings represent the present invention, it will be obvious to those skilled in the art that various changes may be made therein without departing from the true spirit and scope of the present invention.

Reference Numbers 1 diaphragm
2 outer edge
3 inner edge
4 end piece
5 end piece
6 sleeve part
7 sleeve part
8 sleeve part
9 sleeve part
10 longitudinal axis
11 jacket
12 web
13 recess
14 slit
15 jacket
16 web
17 slit
18 recess
19 jacket
20 valve housing
21 valve opening
22 valve rod
23 closure part
24 actuating device
25 piston
26 piston
27 axis
28 spring
29 seal
30 sealing surface

What is claimed is:

1. A diaphragm bellows device comprising:
    a diaphragm bellows with a plurality of successive diaphragms which are welded together alternately at the outer and inner edges, wherein the length of the diaphragm bellows can be adjusted between an expanded state and a contracted state; and
    a plurality of sleeve parts which surround the successive diaphragms and which, together, enclose the successive diaphragms also in the expanded state of the diaphragm bellows over its entire longitudinal extension and overlap to a greater or lesser extent in axial direction of the diaphragm bellows depending on the adjusted length of the diaphragm bellows;
    wherein at least one of the sleeve parts is held on the welded outer edges of two adjoining diaphragms by a snap connection.

2. The diaphragm bellows device according to claim 1, wherein the at least one sleeve part which is held on the welded outer edges of two adjacent diaphragms has a jacket and a web which projects inward from the latter and which is provided at its inner front side with a groove-shaped recess in which the outer edges of the adjacent diaphragms fit.

3. The diaphragm bellows device according to claim 2, wherein this sleeve part comprises an elastic material and a slit is formed in the sleeve part which penetrates the inwardly projecting web over its radial extension and penetrates the jacket over its axial extension.

4. The diaphragm bellows device according to claim 2, wherein the jacket is constructed as a cylindrical jacket.

5. The diaphragm bellows device according to claim 2, wherein the web is arranged at the jacket in the area of an axial edge of the jacket.

6. The diaphragm bellows device according to claim 1, wherein the diaphragm bellows has at least one end piece to which the adjacent end diaphragm is welded, and wherein a sleeve part surrounding a plurality of the diaphragms following the end piece is fastened to at least one end piece.

7. The diaphragm bellows device according to claim 6, wherein at least one of the end pieces has an outer radius which is less than or equal to the radius of the outer edges of the diaphragms.

8. The diaphragm bellows device according to claim 7, wherein the sleeve part fastened to this end piece is held at the end piece by a snap connection.

9. The diaphragm bellows device according to claim 8, wherein the sleeve part clipped to this end piece is constructed similar to the sleeve parts clipped to the outer edges of the diaphragms.

10. A diaphragm bellows device comprising:
    a diaphragm bellows with a plurality of successive diaphragms which are welded together at the outer and inner edges, and first and second end pieces which are welded to the end diaphragms, wherein the diaphragm bellows can be adjusted in length between an expanded state and a contracted state;
    a sleeve part which is fastened to the first end piece and which extends in the direction of the second end piece proceeding from the first end piece;
    a sleeve part which is fastened to the second end piece and which extends in the direction of the first end piece proceeding from the second end piece and;
    one or more sleeve parts fastened to the adjoining outer edges of adjacent diaphragms,
    wherein all of the sleeve parts together enclose the successive diaphragms also in the expanded state of the diaphragm bellows over its entire longitudinal extension and overlap to a greater or lesser extent in axial direction of the diaphragm bellows depending on the adjusted length of the diaphragm bellows.

11. The diaphragm bellows device according to claim 10, wherein the sleeve parts fastened to the end pieces and the one or more sleeve parts fastened to the outer edges of the diaphragms have jackets of different radius.

12. The diaphragm bellows device according to claim 11, wherein the radii of the jackets of the successive sleeve parts increase continuously from the sleeve part which is arranged at one of the end pieces and which has the smallest radius of its jacket.

13. The diaphragm bellows device according to claim 12, wherein the increase in radius is approximately equal to the thickness of the preceding sleeve part.

14. The diaphragm bellows device according to claim 10, wherein at least one of the sleeve parts fastened to the end pieces is detachably fastened to the latter.

* * * * *